(12) United States Patent
Tanaka et al.

(10) Patent No.: US 7,334,238 B2
(45) Date of Patent: Feb. 19, 2008

(54) OPTICAL DISC DEVICE HAVING FIXING PARTS FOR DIRECTLY FIXING A FRAME OF THE OPTICAL DISK DEVICE TO AN ELECTRONIC DEVICE

(75) Inventors: Yuji Tanaka, Chikusino (JP); Kazuo Matsumoto, Kikuchi-gun (JP); Takeshi Watanabe, Tamana (JP); Masanobu Aramaki, Tamana (JP); Hidetaka Taguchi, Tamana (JP); Shingo Sagata, Tamana (JP); Yuichi Uchikawa, Miyaki-gun (JP); Takashi Morishita, Tamana (JP); Fumihide Maeda, Oomuta (JP); Masanari Esaki, Oomuta (JP); Hirohisa Koizumi, Tamana (JP); Shinichi Tokumaru, Yamaga (JP); Hiroki Kokubu, Kurume (JP); Hisashi Arai, Fukuoka (JP); Takeshi Sugimoto, Miyaki-gun (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 462 days.

(21) Appl. No.: 10/827,522

(22) Filed: Apr. 20, 2004

(65) Prior Publication Data

US 2004/0223447 A1 Nov. 11, 2004

(30) Foreign Application Priority Data

| Apr. 21, 2003 | (JP) | ............ P. 2003-115569 |
| Apr. 21, 2003 | (JP) | ............ P. 2003-115570 |
| Apr. 21, 2003 | (JP) | ............ P. 2003-115571 |
| Apr. 21, 2003 | (JP) | ............ P. 2003-115572 |
| Apr. 21, 2003 | (JP) | ............ P. 2003-115573 |
| Apr. 21, 2003 | (JP) | ............ P. 2003-115574 |

(51) Int. Cl.
*G11B 33/02* (2006.01)
*G11B 17/03* (2006.01)
*G11B 17/04* (2006.01)

(52) U.S. Cl. .................... 720/600; 360/97.01
(58) Field of Classification Search ............... 720/600; 360/97.01
See application file for complete search history.

(56) References Cited

U.S. PATENT DOCUMENTS

| 5,497,366 | A |   | 3/1996  | Fujisawa |
| 5,555,623 | A | * | 9/1996  | Goda ............... 29/896.9 |
| 5,684,775 | A |   | 11/1997 | Tanaka et al. |
| 5,862,116 | A |   | 1/1999  | Watanabe et al. |
| 5,878,012 | A |   | 3/1999  | Watanabe et al. |
| 5,936,927 | A | * | 8/1999  | Soga et al. ............ 720/611 |

(Continued)

FOREIGN PATENT DOCUMENTS

CN          1146049          3/1997

(Continued)

*Primary Examiner*—Angel Castro
*Assistant Examiner*—Christopher R. Magee
(74) *Attorney, Agent, or Firm*—Stevens, Davis, Miller & Mosher, LLP

(57) ABSTRACT

The present invention includes a frame, an optical pick-up module fixed to the frame and a circuit board forming a control circuit fixed to the frame. The frame has fixing parts to other members.

59 Claims, 9 Drawing Sheets

U.S. PATENT DOCUMENTS

| | | | |
|---|---|---|---|
| 6,014,357 A | 1/2000 | Watanabe et al. | |
| 6,111,837 A | 8/2000 | Watanabe et al. | |
| 6,141,309 A | 10/2000 | Saitou et al. | |
| 6,151,284 A | 11/2000 | Watanabe et al. | |
| 6,151,285 A | 11/2000 | Watanabe et al. | |
| 6,731,580 B1 * | 5/2004 | Sato et al. | 720/655 |
| 6,738,334 B1 * | 5/2004 | Saitou et al. | 720/659 |

FOREIGN PATENT DOCUMENTS

| | | |
|---|---|---|
| JP | 06231574 | 8/1994 |
| JP | 07130137 | 5/1995 |
| JP | 7201044 | 8/1995 |
| JP | 8171786 | 7/1996 |
| JP | 08287665 | 11/1996 |
| JP | 2001 126460 | 5/2001 |

* cited by examiner

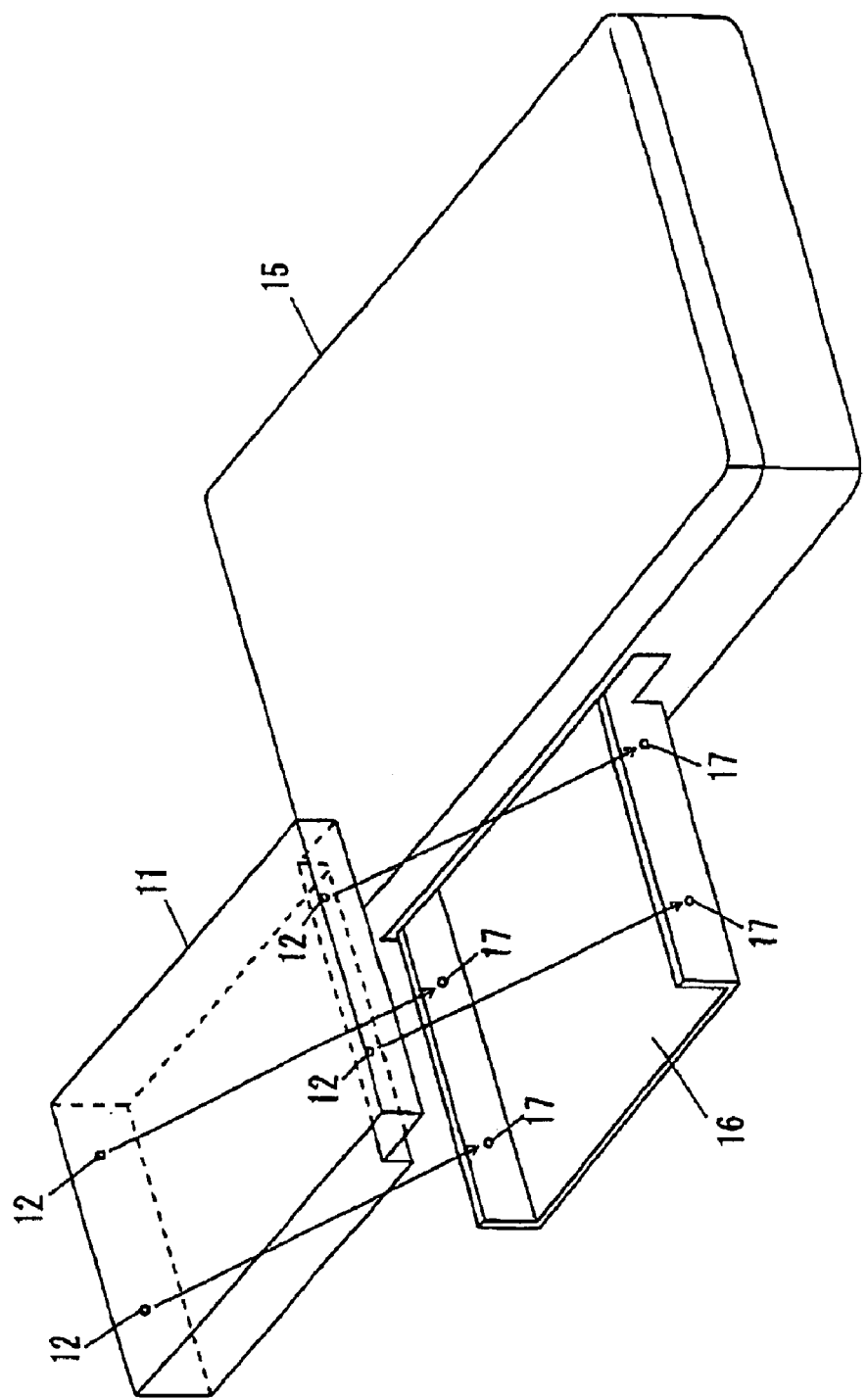

OPTICAL DISC DEVICE HAVING FIXING PARTS FOR DIRECTLY FIXING A FRAME OF THE OPTICAL DISK DEVICE TO AN ELECTRONIC DEVICE

BACKGROUND OF THE INVENTION

1. Field of the Invention

The present invention relates to an optical disk device preferably mounted on an electronic device such as a stationary computer. More particularly, the present invention relates to an optical disk device preferably mounted on a mobile electronic device such as a mobile computer (notebook personal computer or the like), a digital camera, an electronic notebook, etc.

2. Description of the Related Art

A usual optical disk device contained in a computer main body ordinarily has a structure that the whole of the device is accommodated in a casing and the casing is attached to a space of the computer main body so that the optical disk device is attached to the computer main body. An attaching part is provided in the casing and attached to the computer main body.

Now, a method for attaching the usual optical disk device to a portable electronic device will be described below by referring to the drawings.

FIG. 8 is a perspective view showing the structure of the usual optical disk device contained in the portable electronic device. Reference numeral 1 designates an optical pick-up. 2 designates a main shaft. 3 designates a sub-shaft. 4 designates a spindle motor. 5 designates a base. 6 designates a pick-up module (PUM). 7 designates a tray. 8 designates a carriage. 9 designates a rail. 10 designates a casing. 11 designates an optical disk device. 12 designates attaching tapped holes of an optical disk device side. 13 designates a circuit board forming a control circuit or the like. 14 designates a frame (seen from the back side of a disk attaching part).

FIG. 9 is a diagram for showing a method for attaching the usual optical disk device 11 contained in the portable electronic device to the portable electronic device. Reference numeral 15 designates the portable electronic device. 16 designates an attachment provided for attaching the optical disk device to the portable electronic device. 17 designates attaching holes of an attachment side.

In FIG. 8, the optical pick-up 1 moves in the diametrical direction of the spindle motor 4 through the main shaft 2 and the sub-shaft 3 as guides to read or write data on a disk attached to the spindle motor part. The main shaft 2 and the sub-shaft 3 are attached to the base 5 to form the pick-up module 6 as a whole. The pick-up module 6 is fixed to the tray 7. The tray 7 slides relative to the casing 10 by the rail 9. The tray 7 is pulled out from the casing 10 upon attaching and detaching the optical disk and is accommodated in the casing 10 upon reading and writing data. The circuit board 13 forming the control circuit or the like is attached to at least one of the tray or the casing. The above-described structure constitutes the optical disk device 11 contained in the portable electronic device as a whole.

In FIG. 9, on the casing 10 of the optical disk device 11, the attaching tapped holes 12 are provided for attaching the device to the computer main body. In the portable electronic device 15, the attachment 16 is interposed for attaching the device to the portable electronic device. The attaching holes 17 of the attachment side are fixed to the attaching tapped holes 12 of the optical disk device side by screws to mount the attachment 16 on the portable electronic device 15 so that the optical disk device is mounted on and fixed to the portable electronic device.

In the usual disk device, the casing 10 has functions, as described above, for positioning the tray 7 on which the pick-up module 6 or the spindle motor 4 or the like is mounted through the rail 9 and for fixing the optical disk to the portable electronic device 15. An optical disk device whose thickness is reduced basically meets the above-described structure.

As examples of the related art, JP-A-8-171786 and JP-A-7-201044 as described below are exemplified.

However, since the portable electronic device has needed to be increasingly thinned or light, the optical disk device itself has needed to be thinned or light in the usual structure. Particularly, the optical disk device has extremely needed to be light. However, in the above-described structure, the weight of the optical disk device has been extremely hardly reduced.

The present invention solves the above-described usual problem and it is an object of the present invention to provide an optical disk device that can realize a thin and especially light device.

SUMMARY OF THE INVENTION

The present invention provides an optical disk device comprising a frame, an optical pick-up module fixed to the frame, and a circuit board forming a control circuit fixed to the frame, characterized in that the frame has fixing parts to other members.

BRIEF DESCRIPTION OF THE DRAWINGS

FIG. 9 is a view showing a method for attaching the usual optical disk device contained in the portable electronic device to the portable electronic device.

DESCRIPTION OF THE PREFERRED EMBODIMENTS

Figure 1:
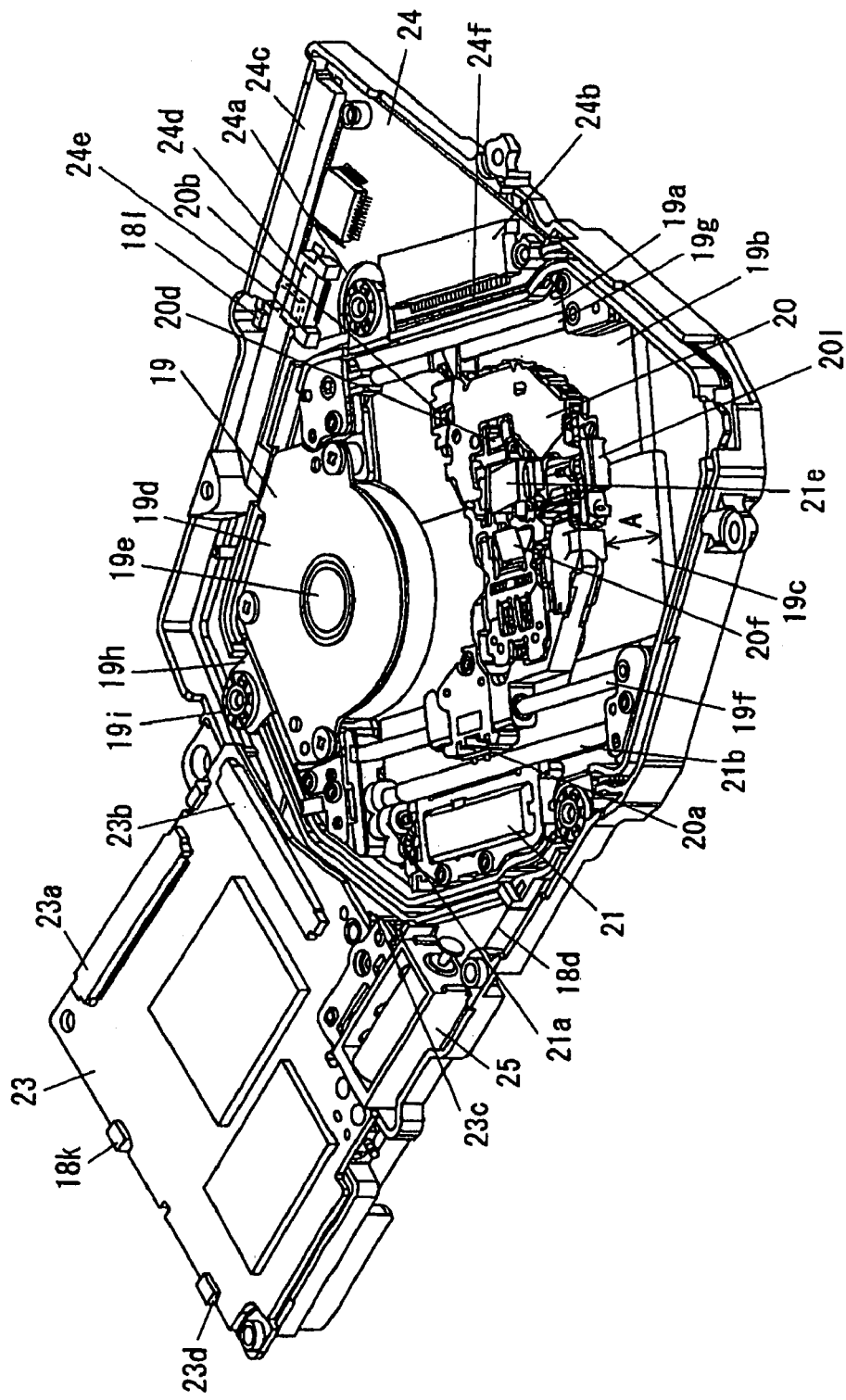
FIG. 1 is a perspective view showing an optical disk device according to one embodiment of the present invention from its front surface.
Figure 2:
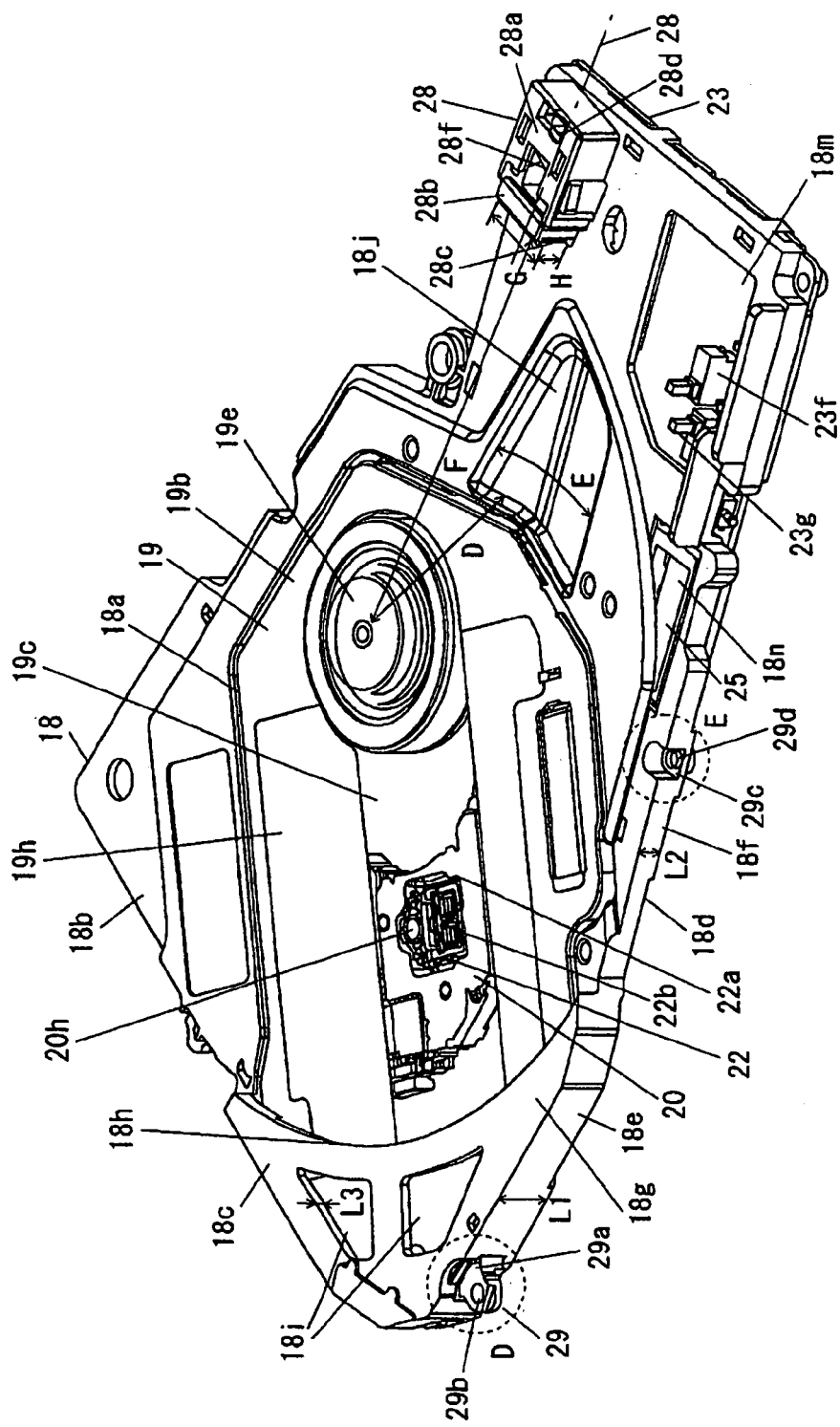
FIG. 2 is a perspective view showing the optical disk device according to one embodiment of the present invention from its back surface with a cover and connecting means removed.
Figure 3:
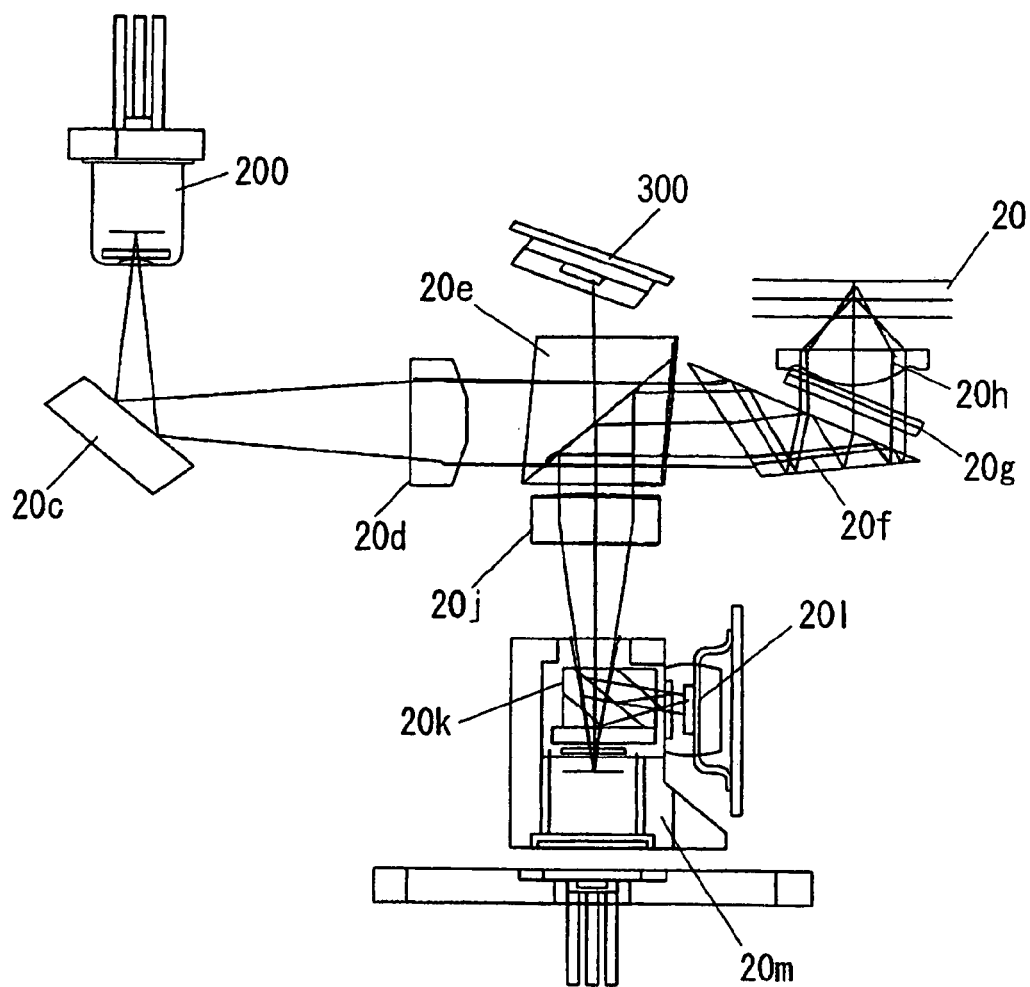
FIG. 3 is a diagram showing the structure of the optical system of the optical disk device according to one embodiment of the present invention.
Figure 4:
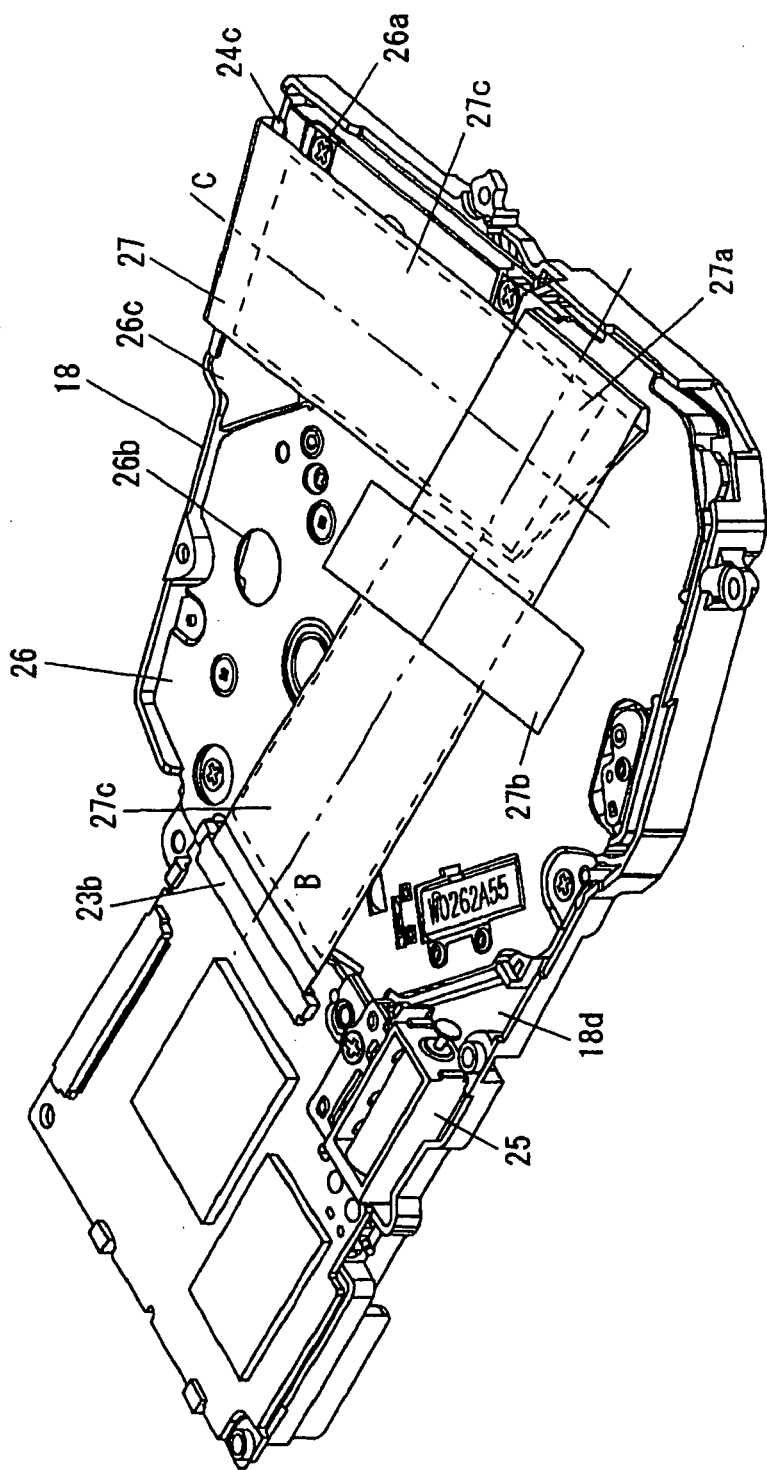
FIG. 4 is a perspective view showing the optical disk device according to one embodiment of the present invention from its back surface.
Figure 5:
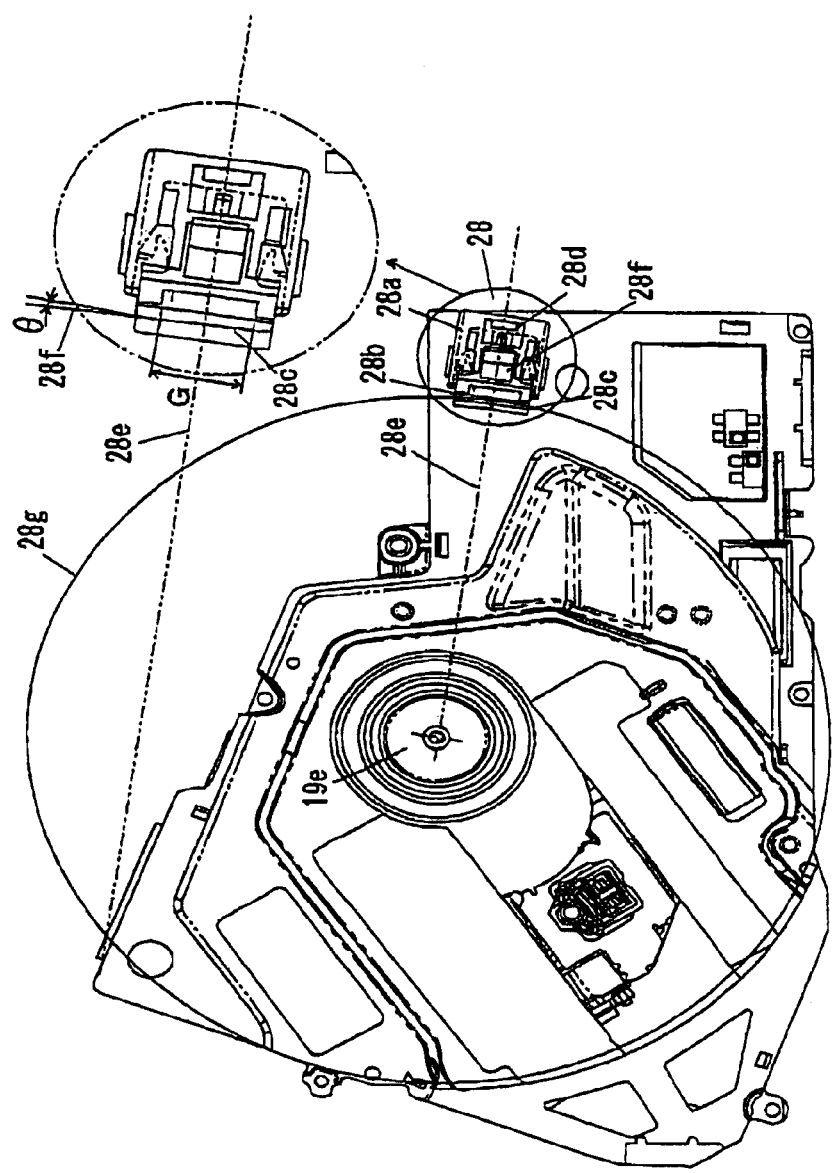
FIG. 5 is a front view of the optical disk device according to one embodiment of the present invention.
Figure 6:
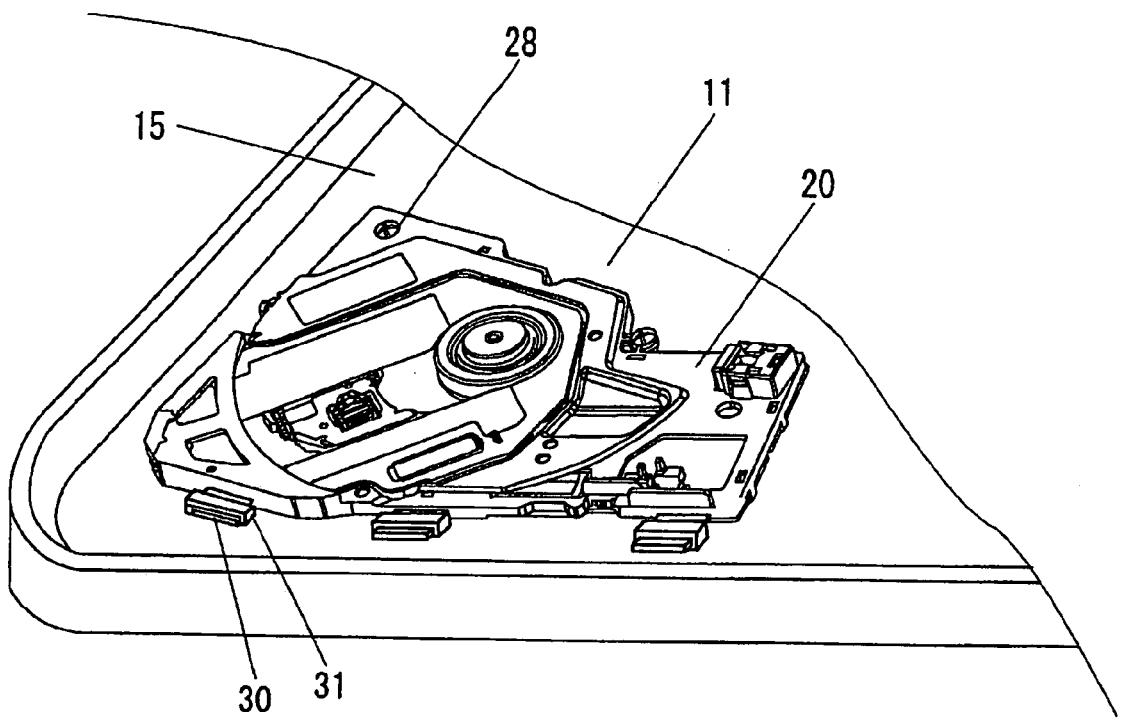
FIG. 6 is a view showing another method for attaching the optical disk device according to one embodiment of the present invention.
Figure 7:
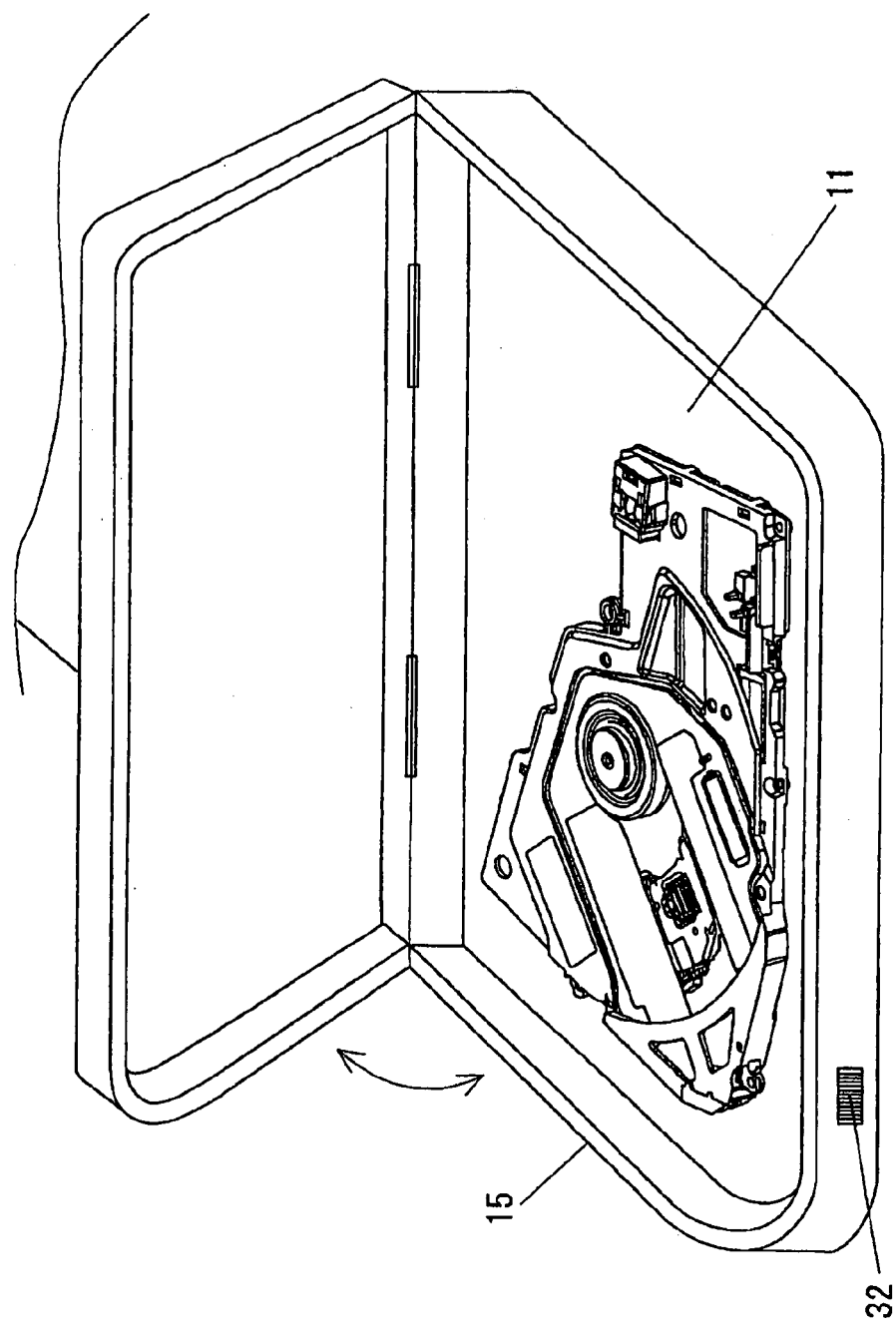
FIG. 7 is a view showing an example of the arrangement of a drive eject switch of the optical disk device according to one embodiment of the present invention.
Figure 8:
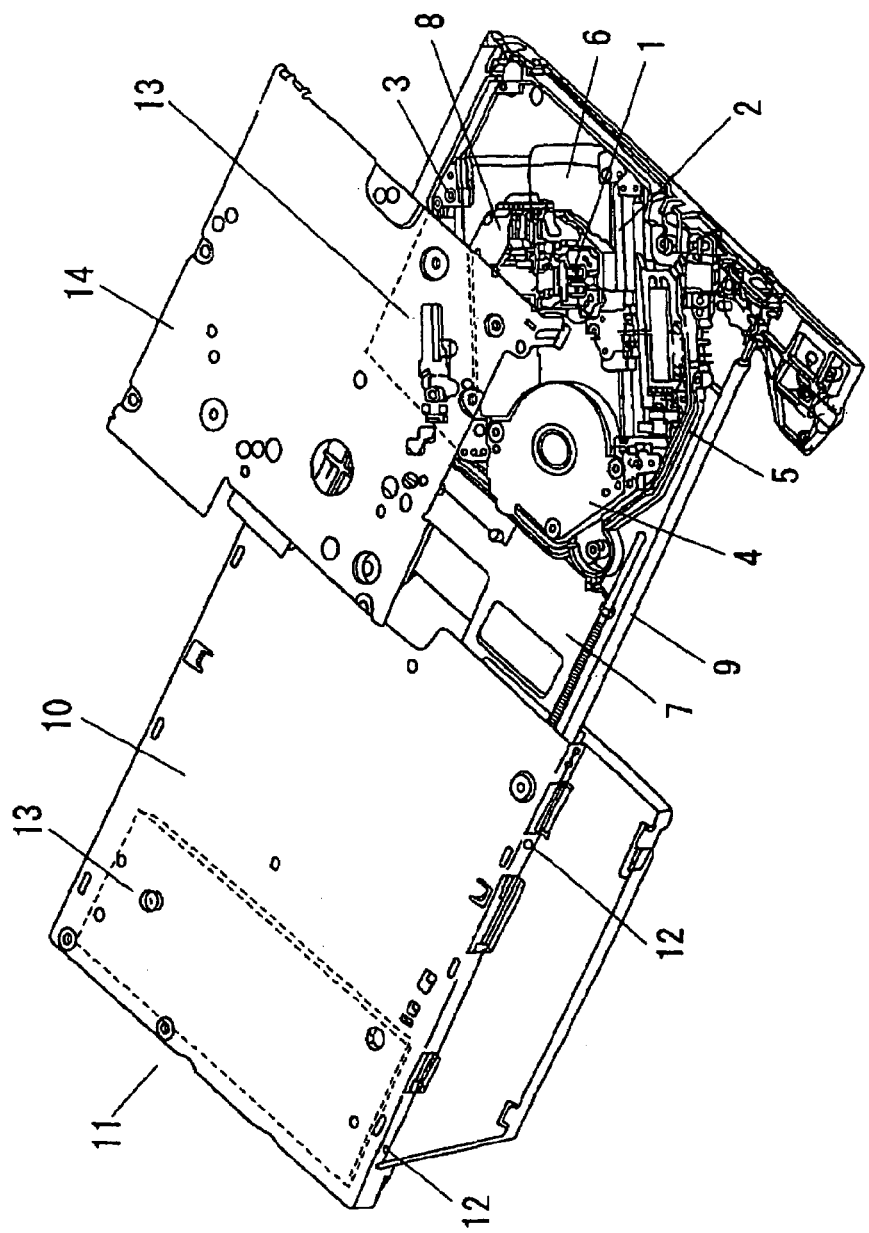
FIG. 8 is a perspective view showing the structure of a usual optical disk device contained in a portable electronic device.

FIG. 1 is a perspective view showing an optical disk device according to one embodiment of the present invention from its front surface. FIG. 2 is a perspective view showing the optical disk device according to one embodiment of the present invention from its back surface with a cover and connecting means removed (In FIG. 2, a cover and a flat cable are omitted). Further, FIG. 3 is a diagram showing the structure of the optical system of the optical disk device according to one embodiment of the present invention. FIG. 4 is a perspective view showing the optical disk device according to one embodiment of the present invention from its back surface. FIG. 5 is a front view of the optical disk device according to one embodiment of the present invention. FIG. 6 is a view showing another method for attaching the optical disk device according to one embodiment of the present invention. FIG. 7 is a view showing an example of the arrangement of a drive eject switch of the optical disk device according to one embodiment of the present invention.

In FIGS. 1 and 2, reference numeral 18 designates a frame for holding respective parts. A material with which the frame 18 is formed is composed of at least one of resin materials such as denatured polyphenylene oxide, an ABS resin, polycarbonate, a mixture of the ABS resin and polycarbonate, polybutylene terephthalate, polyoximethylene, liquid crystal polymer, polyphenylene sulfide, polystyrene, polyacetal, polyamide, etc. or a resin material by adding an inorganic material such as glass or alumina to the resin material or an electric conductive resin material. Particularly, as the material of the frame 18, the denatured polyphenylene oxide or the mixture of the denatured polyphenylene oxide and inorganic fibers or powder is preferable. These materials are used so that rigidity can be improved and a curve prevention can be realized and a weight can be more reduced.

In this embodiment, the frame 18 is entirely integrally formed with one kind of resin material, however, other materials may be partly used, or a plurality of members made of different materials may be arranged on a plane and these members may be mechanically connected together or bonded by an adhesive agent to form the frame 18. Further, the members made of the same material may be connected together in the same manner as described above to form the frame 18.

Further, a plurality of members (made of the same material of different materials) may be laminated in the direction of thickness and laminated by a method of adhesion to from the frame 18. For instance, a metal plate or a ceramic plate high in its rigidity may be sandwiched in between a pair of plate type resin plates to form the frame 18.

When the frame 18 is formed mainly by a resin, members such as plate pieces or wire shaped metal or ceramic materials capable of improving the rigidity may be dispersed in the resin to reduce the weight of the frame 18 itself and increase the rigidity.

The frame 18 has the above structure or the combination of the above-described structures to realize the rigidity or the low weight.

The frame 18 has a through hole 18a into which a pick-up module 19 is inserted. In the frame 18, an uplift part 18c rising from a front surface 18b is provided from a back surface 18d to the front surface 18b. The pick-up module 19 is inserted into the through hole 18a from the back surface 18d. The uplift part 18c covers the end part of the pick-up module 19 and is provided outside the maximum diameter of the diameter of a mounted disk. Thus, a part of the outer periphery of the through hole 18a of the frame 18 has a thickness to reinforce the through hole without interfering with the disk upon mounting the disk. Specifically, as shown in FIG. 2, the thickness L1 of the side part 18e of the uplift part 18c is made larger than the thickness L2 of a side part 18f near the uplift part 18c so that a mechanical strength can be increased. The side part 18e of the uplift part 18c is provided integrally with a top part 18g. That is, the uplift part 18c is composed of at least the side part 18e and the top part 18g. Further, the thickness L1 of the side part 18e is larger than the thickness L3 of the top part 18g. Further, a part not smaller than ½ times as much as the side part 18e forming the uplift part 18c is desirably larger than the thickness L2 of the side part 18f near the side part 18e to increase the mechanical strength. The inner end part 18h of the top part 18g has a circular arc form to form a part of the through hole 18a. On the top part 18g, one or a plurality of through holes 18i are provided to reduce the weight. When the frame 18 is formed, if the through holes 18i are not provided by considering productivity, a structure becomes simple to manufacture the frame 18 easily. Accordingly, when the productivity is to be improved, the through holes 18i are not preferably provided.

Further, on the front surface 18b of the frame 18, a disk taking out recess 18j is provided for easily inserting fingers between the disk and the frame 18 upon detaching the attached disk. The range of the disk taking out recess 18j is set to 22 mm to 55 mm in the diametrical direction D from the center of the axis of a spindle motor 19e, to 12 mm to 26 mm in the circumference direction and to 1 mm to 2.5 mm in depth. Thus, the small diameter type disk can be easily taken out.

In the frame 18 formed as described above, while a strength is ensured, the weight can be suppressed to 15 g or lower (preferably, 13 g or lower) to reduce the weight of the optical disk device.

In the pick-up module 19, a frame 19a and a cover 19b attached to an upper surface are provided. In the cover 19b, a through hole 19c is provided. The spindle motor 19e is attached to the frame 19a by screws or the like through a bottom plate 19d. A part of the spindle motor 19e on which the disk is mounted protrudes from the through hole 19c of the cover 19b to the front surface 18b side of the frame 19a.

A carriage 20 is movably held by two substantially parallel shafts 19f and 19g fixed to the frame 19a.

A motor 21 is fixed to the frame 19a to rotate a rotating shaft 21b attached to the frame 19a so as to freely rotate through a group of gears 21a. The rotating shaft 21b is provided in the vicinity of the shaft 19f and attached substantially in parallel with the shaft 19f. The rotating shaft 21b is provided in an opposite side to the shaft 19g with respect to the shaft 19f. In the rotating shaft 21b, a spiral groove is provided. A guide 20a provided in the carriage 20 is fitted thereto. When the rotating shaft 21b rotates, the guide 20a and the carriage 20 move in two directions (arrows A shown in FIG. 1) along the shafts 19f and 19g. As described above, the motor 21, the rotating shaft 21b and the group of gears 21a as means for moving the carriage 20 are collectively accommodated in an opposite side to the shaft 19g with respect to the shaft 19f.

In the cover 19b on the pick-up module 19, a range substantially opposed to a range in which the carriage 20 moves rises toward a direction separating from the carriage 20 relative to a range that is not substantially opposed to the range in which the carriage 20 moves to form an uplift part 19h. The height of the uplift part 19h is set not to interfere with the carriage 20 in the moving range of the carriage 20. Thus, a step is formed between the uplift part 19h of the cover 19b and a part except it to reinforce the cover 19b.

Accordingly, even when the thickness of the cover 19b is reduced, the deterioration of strength can be suppressed to a minimum.

The carriage 20 is provided with a frame 20b formed by die-casting a metal material. On the frame 20b, an optical system for reading or writing the disk is mounted. In FIG. 3, an example of the structure of the optical system mounted on the frame 20b will be described below.

Laser beam for a DVD emitted from a semiconductor laser 200 for a DVD that emits the laser beam having wavelength of 677 nm or shorter is reflected by a reflecting mirror 20c to change its optical path, and then enters a collimator lens 20d to become parallel lights. The laser beam that becomes the parallel lights passes through a prism 20e, changes their optical paths in a rise prism 20f, passes a ¼λ plate 20g, and then converges on an objective lens 20h and is applied to a disk 20i. A reflected beam from the disk 20i passes through the objective lens 20h the ¼λ plate 20g, changes its direction in the rise prism 20f and the prism 20e, converges on the collimator lens 20j, is incident on a laminated prism 20k to change its direction and is incident on a sensor 201.

On the other hand, a laser beam for a CD emitted from a semiconductor laser 20m for a CD for emitting a laser beam having wavelength of 765 nm to 795 nm passes through the laminated prism 20k, enters the collimator lens 20j to be parallel lights and the parallel lights are incident on the prism 20e. The parallel lights change their directions in the prism 20e and the rise prism 20f, pass the ¼λ plate 20g, converge on the objective lens 20h and are applied to the disk 20i. A reflected light from the disk 20i passes through the objective lens 20h, the ¼λ plate 20g, changes its direction in the rise prism 20f and the prism 20e, converges on the collimator lens 20j, is incident on the laminated prism 20k to change its direction and is incident on the sensor 201. Further, on a front light monitor 300, outgoing lights are partly incident and used to control the adjustment of a quantity of light of a light source.

The rise prism 20f, the ¼λ plate 20g and the objective lens 20h are formed on an actuator 22. The actuator 22 is attached to the carriage 20 through a damper 22a. On the actuator 22, an actuator coil 22b is formed. The actuator coil 22b dynamically corrects the movement of the laser beam on the disk to move the actuator 22, the objective lens 20h and correct the position of the laser beam.

The objective lens 20h faces the front surface 18b side of the frame and all movable range is located within the range of the through hole 19c.

The frame 19a of the pick-up module 19 is provided with an attaching part 19i that is fixed to the frame 18 through a vibration isolating damper 19j. The vibration isolating damper 19j is made of an elastic material, and, specifically, butyl rubber or silicon rubber is used. The attaching parts 19i are provided at least three or more positions and at substantially equal intervals. Especially, at least one of the attaching parts 19i is provided near the spindle motor 19e to effectively prevent the vibration of the spindle motor 19e.

A circuit board is divided into a first circuit board 23 and a second circuit board 24. The first circuit board 23 is formed in a polygonal shape. The second circuit board 24 is formed in a polygonal shape having an arcuate cut out part 24a The first circuit board 23 forms a circuit for controlling a signal of the laser beam for mainly reading and writing the disk. The second circuit board 24 forms a circuit for controlling the motor 21 or the actuator 22 for mainly moving the spindle motor 19e or the carriage 20.

Further, the first circuit board 23 and the second circuit board 24 are respectively fixed to the back surface 18d opposite to side of the frame 18 on which the disk is mounted. The first circuit board 23 and the second circuit board 24 are respectively provided in the right and left sides with respect to a straight line connecting the spindle motor 19e and the objective lens 20h as a boundary. In such a way, the circuit board for controlling the optical disk device is divided into two and fixed to the frame 18. Thus, the form of the optical disk device, that is, the form of the frame 18 can be configured to an arbitrary form adapted to an electronic device on which the optical disk device is mounted. Further, the mounting characteristics of the optical disk device on the electronic device can be improved.

In this embodiment, the circuit board is divided into two, however, the circuit board may be divided into three.

The first circuit board 23 is adjacent to the pick-up module 19 in the back surface 18d side of the frame 18 and attached to the shaft 19f side with respect to the spindle motor 19e. In the end side of the first circuit board 23, a plurality of cut-out type engaging parts 23d are provided and engaged with a plurality of hook shaped engaging parts 18k provided in the end side of the frame 18. Further, screw fastening parts are screwed and fixed to the frame 18. The engaging parts 18k are formed integrally with the frame 18. However, the engaging parts 18k or parts including the engaging parts 18k may be composed of separate members made of the same material or different materials. Then, the engaging parts 18k or the parts including the engaging parts 18k may be mechanically connected to the prescribed positions of the frame 18 by screwing, welding or fitting in forms or stuck and fixed thereto by an adhesive agent or the like. To the first circuit board 23, two connectors 23a and 23b are attached. The long sides of the connectors 23a and 23b are respectively arranged substantially in parallel with the sides of the first circuit board 23. The cable insert parts of the connectors 23a and 23b are respectively directed outward of the board. Further, the long side of the connector 23b is attached substantially in parallel with one side 23c of the first circuit board 23 facing the pick-up module 19.

The second circuit board 24 is adjacent to the pick-up module 19 in the back surface 18d side of the frame 18 and attached to the shaft 19g side with respect to the spindle motor 19e. The second circuit board 24 is fixed to the frame 18 by engaging with a plurality of hook shaped engaging parts 181 located in the end side of the frame 18 and further screwing screw fastening parts. The engaging parts 181 are formed integrally with the frame 18. However, the engaging parts 181 or parts including the engaging parts 181 may be composed of separate members made of the same material or different materials. Then, the engaging parts 181 or the parts including the engaging parts 181 may be mechanically connected to the prescribed positions of the frame 18 by screwing, welding or fitting in forms or stuck and fixed thereto by an adhesive agent or the like.

To the second circuit board 24, three connectors 24b, 24c and 24d are attached and a connecting part 24e is provided. The long sides of the connectors 24b and 24c are respectively arranged substantially in parallel with the sides of the second circuit board 24. The long side of the connector 24b is attached in substantially parallel with one side 24f of the second circuit board 24 facing the pick-up module 19. The cable insert part of the connector 24b is directed inward of the board. The cable insert part of the connector 24c is directed outward of the board. The connector 24b is connected to the carriage 20 through connecting means (not shown) such as a flat cable or a flexible board. The connector 24c is connected to the first circuit board 23 through connecting means (not shown) such as a flat cable or a flexible board. The connector 24d is connected to the motor 21 for moving the carriage 20 through connecting means (not shown) such as a flat cable or a flexible board. The connecting part 24e is arranged in the back surface (a surface opposite to a surface on which the connectors 24b, 24c and 24d are arranged) of the second circuit board 24 and connected to the spindle motor 19e through connecting means (not shown) such as a flat cable or a flexible board.

The circuit of the first circuit board 23 and the circuit of the second circuit board 24 may be formed on one board to form one circuit board. In this case, since the connecting means for connecting the boards is not necessary, a more inexpensive structure may be obtained.

Further, the circuit board is formed with one or a plurality of boards and they may be accommodated in the diameter of the disk or in the vicinity of the diameter. In this case, the area of the optical disk device on which the disk is mounted that is viewed from a front surface may be made minimum.

A solenoid 25 is related to an eject operation of the disk, sandwiched in between the first circuit board 23 and the pick-up module 19 and fixed to the back surface 18d side of the frame 18.

To the back surface 18d side of the frame 18, a cover 26 with which the pick-up module 19 and the second circuit board 24 are covered is attached. When there is another method for shielding the second circuit board 24, the cover 26 does not need to shield the second circuit board 24. Apart of a cover fixing part 26a for fixing the cover 26 to the frame 18 directly comes into contact with the earth parts of the first circuit board 23 and the second circuit board 24 or comes into contact therewith through a spring to fix and ground the cover 26 by screwing and further fix the circuit board 23 and the second circuit board 24.

In the cover 26, a plurality of through holes 26b are provided to avoid the interference with a part of parts forming the pick-up module 19 or reduce the weight. Especially when the weight does not need to be further reduced, the through holes for reducing the weight can be omitted. In the cover 26, a protruding part 26c pushed out toward a direction separating from the second circuit board 24 is provided within a range substantially opposed to the second circuit board 24. The connector 24b on the second circuit board 24 is covered with the protruding part 26c.

The first circuit board 23 is connected to the second circuit board 24 by connecting means 27 connected to the connector 23b on the first circuit board 23 and the connector 24c on the second circuit board 24. The connecting means 27 is arranged so as to cover at least a part of the cover 26 therewith. As the connecting means 27, a flat belt type such as the flat cable or the flat board is desired to thin the optical disk device. The connecting means 27 connected to the connector 24c on the second circuit board 24 is folded back so as to bypass the end part of the cover 26 in the vicinity of the connector 24b and pulled out to a position for covering the cover 26. When linear connecting means cannot be used due to the positional relation between the connector 23b on the first circuit board 23 and the connector 24c on the second circuit board 24, curved connecting means may be used to meet the positional relation of the connectors. Thus, the circuit boards can be connected together without preventing the thickness of the optical disk device from decreasing. Further, the linear and flat belt type connecting means 27 is provided with a bent part 27a so that the inexpensive linear connecting means can meet the positional relation between the connector 23b on the first circuit board 23 and the connector 24c on the second circuit board 24. The bent part 27a is provided at least on a vertical bisector B of the long side of the connector 23b or a vertical bisector C of the long side of the connector 24c to reduce the torsion or swell on the surface of the flat belt type connecting means. The bent part 27a is bent even number of times so that contact parts at both the ends of the flat belt type connecting means 27 with the connectors come to the same side of the flat surface of the flat belt. Thus., most of connectors for a flat cable whose contact parts with the cable are on its single surfaces can meet the flat belt type connecting means. For instance, FIG. 4 shows an example of bending the flat belt type connecting means twice. The flat belt type connecting means 27 coming from the connector 23b on the first circuit board 23 is bent at the bent part 27a, pulled out once to an opposite side to the connector 24c relative to the vertical bisector B of the long side of the connector 23b and folded again on the bent part 27a and pulled out to the connector 24 side.

Fixing means 27b is used for fixing the flat belt type connecting means 27 to the cover 26. As the connecting means 27b, a method for fixing the connecting means 27 to the cover 26 by using an adhesive tape or a method in which a flexible member as the fixing means 27b is connected to the cover with a space provided to pass the connecting means 27 between the connected parts and detachably fix the connecting means to the cover is preferable. A double side tape may be sandwiched in between the connecting means 27 and the cover 26 to fix the connecting means to the cover.

A through hole 18m is provided in the vicinity of a part opposed to the first circuit board 23 of the frame 18. A press button switch 23f disposed in the first circuit board 23 passes through the through hole 18m and protrudes from the front surface 18b of the frame 18. The movable direction of a press button 23g of the press button switch 23f is substantially perpendicular to the surface of the first circuit board 23. The dimension of the through hole 18m is determined in view of the required degree of decrease of weight as well as the decrease of weight of the frame 18.

The press button switch 23f serves to detect the opening and closing state of an opening and closing cover attached to a portable electronic device side and can supply a detected control signal to the portable electronic device side. The press button switch 23f may be provided on the front surface 18b of the frame 18.

Further, on the frame 18, another through hole 18n is provided and a part of the solenoid 25 is exposed when viewed from the front surface 18b side of the frame 18.

Further, on the front surface 18b of the frame 18, a brake 28 for stopping the rotation of the disk is provided as required. The brake 28 comprises a case 28a, a movable part 28b, a part 28c and a spring 28d. The case 28a is formed integrally with the frame 18. However, the case 28a may be composed of another member made of the same material as that of the frame 18 or a different material from that of the frame and may be attached to a prescribed position of the frame 18. Further, the case 28a has side walls formed integrally with the frame, protruding on the front surface side of the frame and surrounding at least three sides and a top plate provided integrally with the side walls to cover an upper part with an optical pick-up module side opened. In FIG. 5, a moving axis of the movable part 28b passes the center of rotation of the spindle motor 19e to regulate a movable range by the case 28a. The spring 28d is set so as to push out the movable part 28b toward the diametrical center of the spindle motor 19e. The part 28c is provided on a surface of the movable part 28c facing the diametrical center of the spindle motor 19e and made of a material high in its friction coefficient relative to a material of the disk such as silicon rubber, felt, etc. The surface of the part 28c that comes into contact with the disk has an inclination of an angle of θ on a surface parallel to the disk relative to the vertical surface of the moving axis 28e. Thus, even when there is unevenness in the outer form of the disk, the amount of contraction of the spring 28d when the part 28c comes into contact with the disk is constant, so that the pressing force of the part 28c to the disk is constant. Specifically, an expected uneven width of the outer form of the disk is 0.3 mm to 0.6 mm. An amount of inclination θ of the surface of the part 28c coming into contact with the disk and width G shown in FIG. 5 are set so as to meet the expected uneven width of the diameter of the disk. The movable range of the movable part 28b and the part 28c is set to a distance F from the center of the spindle motor 19e to the center of the surface of the part 28c, that is, 58.5 mm to 61.5 mm. G is set to 4 mm to 10 mm. Further, the spring 28d is set so that a pressing force of a prescribed load (for instance, the weight of about 1og) is exerted on the disk from the part 28c when the disk having the diameter of 120 mm is mounted and the part 28c collides with the disk for braking. In such a setting, the rotation of the disk having the diameter of 120 mm can be adequately stopped. Further, the dimension H of the surface of the part 28c in contact with the disk in the direction of thickness of the disk is set to 4 mm to 10 mm. Thus, upon stopping the disk, the side surface of the disk can assuredly abut on the part 28c including a backlash of the disk in the direction of thickness of the disk or a curve of the disk within a prescribed range upon mounting the disk. The movable part 28b is provided with an inclined surface 28f. An external pressing rod presses the inclined surface 28f to obtain the movement of the movable part 28b in the diametrical direction of the spindle motor 19e. Specifically, the pressing rod is provided on the disk taking out movable disk cover of the portable electronic device. The movable disk cover is closed so that the pressing rod presses the inclined surface 28f. Then, the movable part 28b separates from the disk 28g to release a brake.

The outer form of the frame 18 is set to a form that can hold the pick-up module 19, the first circuit board 23 and the second circuit board 24, for instance, a form that can surround the outer periphery of the pick-up module 19, with which the first circuit board 23 and the second circuit board 24 can be covered and to which a holding part can be attached.

Further, an optical disk device fixing part 29 protrudes from the side part 18e or the side part 18f of the frame 18, or enters the inside of the frame 18 from the side part of the frame 18 or is provided in the surface of the frame 18.

The optical disk device fixing part 29 is provided integrally with the frame 18. However, the optical disk device fixing part 29 or a part including the optical disk device fixing part 29 may be composed of another member made of the same material or a different material. The optical disk device fixing part 29 or the part including the optical disk device fixing part 29 maybe mechanically connected to the prescribed position of the frame 18 by screwing, welding or fitting in form or may be stuck and attached thereto by an adhesive agent or the like.

2 to 10 optical disk device fixing parts 29 are preferably provided, and about 4 to 8 fixing parts are especially preferably provided. One optical disk device fixing part 29 hardly realizes an attachment with a sufficient strength. More than 10 optical disk device fixing parts need much time to attach them so that a productivity may be possibly deteriorated.

For instance, when screws are stood substantially vertically on the front surface 18b of the frame 18 in the outer periphery of the frame 18 to be screwed, the form of the optical disk device fixing part 29 comprises, as shown in a part D of FIG. 2, a land 29a protruding substantially in parallel with the front surface 18b of the frame 18 from the side part 18e or the side part 18f, of the frame 18 and a hole 29b substantially perpendicular to the surface of the frame 18 for passing a screw. Further, as shown in a part E of FIG. 2, the optical disk device fixing part 29 comprises a land 29c entering the front surface 18b of the frame 18 substantially in parallel therewith from the side part 18e or the side part 18f of the frame 18 and a hole 29d substantially perpendicular to the surface of the frame 18 for passing a screw. Further, the optical disk device fixing part 29 may be formed with a flat plate having a form shown in the part D of FIG. 2 that protrudes substantially vertically to the front surface 18b of the frame 18. A tapped hole may be provided substantially vertically to the protruding flat plate and the screw may be directed to be parallel to the front surface 18b of the frame 18 so that the screw is attached to the opposed fixing part of the portable electronic device.

Further, the form of the optical disk device fixing part 29 may have a connecting part capable of being thermally welded or ultrasonic welded so that the optical disk device can be fixed to the portable electronic device by a thermally welding method or a ultrasonic welding method.

Further, as other method for fixing the optical disk device to the portable electronic device, a method may be employed that both the optical disk and the portable electronic device have forms (preferably, fixing parts having flat parts) capable of being fixed by an adhesive agent to partly fix the optical disk device to the portable electronic device by the adhesive agent or fix the optical disk device thereto by using an adhesive material and other connecting means. In this case, the use of the adhesive agent makes it possible to fix the optical disk device even in a position where a screwing is difficult and the degree of freedom in design is increased.

Further, as other method for fixing the optical disk device to the portable electronic device, FIG. 6 is a diagram showing other method for attaching the optical disk device according to the embodiment of the present invention. On the frame 18 of the optical disk device, the optical disk device fixing parts 29 are provided so that the optical disk device is fixed by screwing or welding or fixed by the adhesive agent. Further, one or a plurality of engaging hooks 30 are provided. In the inner surface of the portable electronic device 15, engaging parts 31 for the engaging hooks 30 are provided. Thus, after the engaging hooks 30 of the frame 18 of the optical disk device 11 are engaged with the engaging parts 31 in the inner surface of the portable electronic device 15, the optical disk device is fixed by the optical disk device fixing parts 29. Thus, the optical disk device 11 is fixed to the inner bottom surface of the portable information terminal 15. In this attaching method, fitting hooks are partly used so that screwed positions can be reduced and an assembly possibility can be improved.

Further, FIG. 7 is a diagram showing an example of an arrangement of a drive eject switch in this embodiment. In order to take out the disk, the drive eject switch 32 provided in the portable electronic device 15 is operated. Thus, a movable disk cover 33 provided in a computer main body is opened and control operations such as finishing a performed application, stopping the spindle motor or the like are carried out. In the related art, the drive eject switch is provided in the optical disk device side. However, the drive eject switch is not attached to the optical disk device, but the drive eject switch is attached to a portable electronic device main body as described above. Accordingly, a mechanism for holding the drive eject switch can be omitted from the optical disk device side to make the device compact. The whole of the computer can be miniaturized.

In the optical disk device constructed as described above, since the respective members are attached to the frame 18 and the frame 18 is directly attached to the portable electronic device by screwing or the like, which is different from the usual structure that the members are respectively attached to the casing 10 which is attached to the portable electronic device, the casing 10 is not necessary. Accordingly, a thinner and lighter portable electronic device than the portable electronic device to which the usual optical disk device is attached can be provided.

The optical disk device according to this embodiment may be attached not only to the portable electronic device but also to a fixed electronic device.

The optical disk device as shown in the above-described one example can realize the weight of 135 g or lower (preferably, 120 g or lower, and more preferably, 100 g or lower). Such an optical disk device is mounted on an electronic device, so that the electronic device itself can be miniaturized.

The optical disk device according to one embodiment of the present invention is especially useful for a structure in which a disk with a diameter whose maximum diameter of a disk capable of being mounted ranges from 110 mm to 130 mm can be mounted.

Further, a lead-free material is used for the members forming the pick-up module or the connecting materials of the members, electronic parts forming the circuit board or the connecting materials of the electronic parts and other members mounted on the frame or the connecting materials of the members. Thus, the device gentle for an environment can be provided.

CROSS REFERENCE TO RELATED APPLICATION

This application is based upon and claims the benefit of priority of Japanese Patent Application No2003-115569 filed on May 21, 2003 and Japanese Patent Application No2003-115570 filed on May 21, 2003 and Japanese Patent Application No2003-115571 filed on May 21, 2003 and Japanese Patent Application No2003-115572 filed on May 21, 2003 and Japanese Patent Application No2003-115573 filed on May 21, 2003 and Japanese Patent Application No2003-115574 filed on May 21, 2003 , the contents of which are incorporated herein by reference in its entirety.

What is claimed is:

1. An optical disk device disposed in an electronic device, said optical disk device comprising:
    a frame;
    fixing parts for directly fixing the frame to the electronic device;
    an optical pick-up module, fixed to the frame; and a circuit board with a control circuit, fixed to the frame, wherein the frame has an uplift part rising to a surface side on which a disk is mounted, the uplift part includes a side part of the frame and a top part provided on said side part, said side part of the uplift part is formed to be thicker in the direction of thickness than a side part of the frame that is near the uplift part, and the top part forms a part of the inner peripheral part of a through hole provided in the frame.

2. The optical disk device according to claim 1, wherein at least a part of the fixing parts has a form capable of being screwed.

3. The optical disk device according to claim 1, wherein at least a part of the fixing parts has a form capable of being ultrasonic welded or thermally welded.

4. The optical disk device according to claim 1, wherein at least a part of the fixing parts has a form capable of being fixed by an adhesive agent and at least a part of the fixing parts can be fixed by the adhesive agent or can be fixed by using an adhesive material and other connecting means to the electronic device.

5. The optical disk device according to claim 1, wherein at least a part of the fixing parts has a form capable of being engaged between the fixing part and the corresponding fixing part of other members.

6. The optical disk device according to claim 1, wherein at least a part of the fixing parts is provided integrally with the frame.

7. The optical disk device according to claim 1, wherein at least a part of the fixing parts comprises another member made of the same material as that of the frame or a different material from that of the frame and attached to a prescribed position of the frame.

8. The optical disk device according to claim 1, wherein at least a part of the fixing parts has a substantially planar part and the substantially planar part of the fixing part is substantially parallel to the surface of the frame.

9. The optical disk device according to claim 1, wherein at least a part of the fixing parts has a substantially planar part and the substantially planar part of the fixing part is substantially perpendicular to the surface of the frame.

10. The optical disk device according to claim 1, where in at least a part of the fixing parts is provided in the outer peripheral part of the frame.

11. The optical disk device according to claim 1, wherein the fixing parts are disposed at two to ten positions.

12. The optical disk device according to claim 1, wherein the weight of the frame is 15 g or lower.

13. The optical disk device according to claim 1, wherein the weight of the optical disk device is 135 g or lower.

14. The optical disk device according to claim 1, wherein a through hole is provided in the frame and the optical pick-up module is attached to the back surface of the frame so that at least a part of the optical pick-up module is exposed from the through hole.

15. The optical disk device according to claim 1, wherein the optical pick-up module comprises: a module frame; a pair of shafts, provided in the module frame; a carriage provided on the pair of shaft so as to be movable and having optical menibers mounted thereon; a driving unit, provided in the module frame to drive the carriage; a cover, attached to the module frame, and having a through hole and exposing at least a part of the carriage from the through hole; and a spindle motor, attached to the module frame, wherein the module frame is fixed to the frame through a vibration preventing material.

16. The optical disk device according to claim 1, wherein a lead-free material is used for members forming the optical pick-up module or the connecting materials of the members, electronic parts forming the circuit board or the connecting materials of the electronic parts and other members mounted on the frame or the connecting materials of the members.

17. The optical disk device according to claim 1, wherein the frame is made of a material including a resin and the weight of the frame is 13 g or lower.

18. The optical disk device according to claim 17, wherein a resin material is an electric conductive resin material.

19. The optical disk device according to claim 17, wherein the frame is formed by laminating a plurality of members in the direction of thickness.

20. The optical disk device according to claim 17, wherein the frame is formed by arranging a plurality of members made of different materials in a planar form and connecting them.

21. The optical disk device according to claim 17, wherein the frame is formed by arranging a plurality of members made of the same material in a planar form and connecting them.

22. The optical disk device according to claim 17, wherein the frame is formed by sandwiching a metal plate or a ceramic plate in between a pair of plate type resin plates.

23. The optical disk device according to claim 17, wherein the frame is formed by dispersing plate type pieces, linear metal, ceramic materials, etc. in a resin.

24. The optical disk device according to claim 17, wherein an uplift part is provided outside the maximum diameter of a disk on the surface of the frame on which the disk is mounted to reinforce the frame.

25. The optical disk device according to claim 17, wherein a recessed part for taking out the disk is provided on the surface of the frame on which the disk is mounted.

26. The optical disk device according to claim 17, wherein the cover of the optical pick-up module disposed on substantially the same surface as the surface of the frame on which the disk is mounted forms an uplift part within a range substantially opposed to a moving range of the carriage in the optical pick-up module.

27. The optical disk device according to claim 1, wherein a plurality of circuit boards are provided and the plurality of circuit boards are separated from each other and fixed to the frame.

28. The optical disk device according to claim 27, wherein an engaging unit for engaging the frame with the circuit boards is provided.

29. The optical disk device according to claim 27, wherein hook parts are provided in the frame and engaging parts engaging with the hook parts are provided in the circuit boards.

30. The optical disk device according to claim 27, wherein the plurality of circuit boards include a first circuit board for controlling at least the optical pick-up module and a second circuit board for controlling at least one of recording and reproduction.

31. The optical disk device according to claim 27, wherein the plurality of circuit boards are attached to a back surface opposite to the side of the frame on which the optical disk is mounted.

32. The optical disk device according to claim 27, wherein a through hole is provided in the frame and the optical pick-up module is attached to the back surface of the frame so that at least a part of the optical pick-up module is exposed from the through hole.

33. The optical disk device according to claim 32 further comprising:
a spindle motor for rotating an optical disk; and
an objective lens for focusing a laser beam on the optical disk,
wherein the plurality of circuit boards are respectively provided in both the sides of the frame with respect to a straight line for connecting the spindle motor to the objective lens as a boundary.

34. The optical disk device according to claim 27, wherein the plurality of circuit boards are connected together by a flat plate type connecting member and the flat plate type connecting member is folded at least once.

35. The optical disk device according to claim 34, wherein the flat plate type connecting member is folded even number of times.

36. The optical disk device according to claim 34, wherein the folded part of the flat plate type connecting member is provided in the vicinity of a vertical bisector of the long side of a connecting part of a connector for connecting the connecting member.

37. The optical pick-up device according to claim 34, wherein the plurality of circuit boards respectively have connectors and the connecting member is detachably attached to the connectors.

38. The optical disk device according to claim 34, wherein the optical pick-up module is sandwiched in between the frame and the cover fixed to the frame and the connecting member is provided in an opposite side to the side of the cover in which the optical pick-up module is provided.

39. The optical disk device according to claim 38, wherein a resin sheet is provided in at least a part of the opposed part of the connecting member to the cover.

40. The optical disk device according to claim 38, wherein a fixing member for fixing the connecting member to the cover is provided.

41. The optical disk device according to claim 40, wherein a double side tape is used as the fixing member.

42. The optical disk device according to claim 40, wherein an adhesive member is used as the fixing member and the connecting member is fixed to the cover by the adhesive member.

43. The optical disk device according to claim 40, wherein a flexible member is used as the fixing member and the flexible member is connected to the cover with a space provided and the connecting member passes between the connecting parts of the flexible member to be detachably fixed.

44. The optical disk device according to claim 34, wherein as the flat plate type connecting member, a flat cable or a flexible board is used.

45. The optical disk device according to claim 1, wherein a control switch directly or indirectly fixed to the frame is provided.

46. The optical disk device according to claim 45, wherein the control switch is provided on the circuit board.

47. The optical disk device according to claim 45, wherein the control switch transmits a control signal of the electronic device.

48. The optical disk device according to claim 45, wherein the control switch is attached so as to move along the direction of thickness of the frame.

49. The optical disk device according to claim 45, wherein a plurality of moving members of the control switch are provided.

50. The optical disk device according to claim 1, wherein a brake member abutting on the outer periphery of a disk fixed and mounted on the frame is provided and the brake member is disposed so as to abut on or not abut on the outer periphery of the disk.

51. The optical disk device according to claim 50, wherein the brake member comprises: a contact piece, movably provided; an urging unit, resiliently pressing the contact piece; and at least one case, housing the respective parts.

52. The optical disk device according to claim 51, wherein the case is formed integrally with the frame and protrudes on the surface of the frame on which the disk is mounted.

53. The optical disk device according to claim 52, wherein the case comprises: side walls, formed integrally with the frame and protruding on the surface side of the frame and surrounding at least three parts; and a top plate, formed integrally with the side walls and covering an upper part and is opened in the optical pick-up module side; and wherein the contact piece is provided so as to close the opening and held to be movable so that the contact piece comes near to or separates from the optical pick-up module.

54. The optical disk device according to claim 50, wherein the brake member is moved due to the action of an external member.

55. The optical disk device according to claim 54, wherein as the external member, a member provided in the electronic device or the like and interlocking with an operation for taking out the disk and the interlocking member acts on the brake member.

56. The optical disk device according to claim 1, wherein the electronic device comprises a computer.

57. The optical disk device according to claim 1 further comprising:

a switch configured to control an operation of a cover which covers an optical disk mounted on the optical disk device, wherein the switch is disposed on the electronic device in which the optical disk device is disposed via the fixing parts.

58. The optical disk device according to claim 1, wherein the electronic device comprises a portable electronic device.

59. The optical disk device according to claim 1, wherein the electronic device comprises a fixed electronic device.

* * * * *